United States Patent
Radhakrishnan et al.

(10) Patent No.: US 11,130,583 B2
(45) Date of Patent: Sep. 28, 2021

(54) CONTROL SYSTEM FOR AIRCRAFT ANTI-ICING

(71) Applicant: GOODRICH AEROSPACE SERVICES PRIVATE LIMITED, Bangalore (IN)

(72) Inventors: Senthilkumar Radhakrishnan, Bangalore (IN); Vanukuri Venkatareddy, Bangalore (IN); Jeffrey Harasha, Del Mar, CA (US); Phillip Andelson, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 448 days.

(21) Appl. No.: 16/226,261

(22) Filed: Dec. 19, 2018

(65) Prior Publication Data

US 2020/0140098 A1     May 7, 2020

(30) Foreign Application Priority Data

Nov. 2, 2018   (IN) .............................. 201841041587

(51) Int. Cl.
   *B64D 15/22*     (2006.01)
   *B64D 15/04*     (2006.01)

(52) U.S. Cl.
   CPC .............. *B64D 15/22* (2013.01); *B64D 15/04* (2013.01)

(58) Field of Classification Search
   CPC .................................. B64D 15/04; B64D 15/22
   See application file for complete search history.

(56) References Cited

U.S. PATENT DOCUMENTS

| 4,783,026 | A | | 11/1988 | Rumford |
| 4,831,819 | A | | 5/1989 | Norris |
| 4,852,343 | A | | 8/1989 | Norris |
| 6,058,725 | A | * | 5/2000 | Monfraix ............... B64D 13/02 |
| | | | | 165/235 |
| 7,536,865 | B2 | * | 5/2009 | Mikhail .................... F02C 9/18 |
| | | | | 60/795 |
| 7,930,928 | B2 | * | 4/2011 | Ruston ..................... F02C 7/24 |
| | | | | 73/112.01 |

(Continued)

FOREIGN PATENT DOCUMENTS

EP          3034813          6/2016

OTHER PUBLICATIONS

European Patent Office, European Search Report dated Feb. 11, 2020 in Application No. 19206980.5.

(Continued)

*Primary Examiner* — Philip J Bonzell
*Assistant Examiner* — Michael B. Kreiner
(74) *Attorney, Agent, or Firm* — Snell & Wilmer L.L.P.

(57) ABSTRACT

A control system for aircraft anti-icing is disclosed including a conduit coupled at a first end to a source of hot high-pressure bleed air, a control valve in fluid communication with the conduit and an injector head, wherein the control valve is in electronic communication with a controller and configured to regulate the flow of bleed air between the conduit and the injector head, and a first sensor in electronic communication with the controller and configured to report a first data. The system may initialize a control valve to an initial regulated pressure. The system may determine a control temperature and control the control valve based on the control temperature, the first data, and a set value.

17 Claims, 9 Drawing Sheets

(56) References Cited

U.S. PATENT DOCUMENTS

| | | | |
|---|---|---|---|
| 7,959,109 B2* | 6/2011 | Dasilva | B64D 15/04 |
| | | | 244/134 R |
| 9,156,556 B2 | 10/2015 | Chene | |
| 9,341,280 B2 | 5/2016 | Pirat | |
| 9,346,549 B2 | 5/2016 | Pirat | |
| 9,849,992 B2* | 12/2017 | Goodman | B64D 33/02 |
| 9,994,327 B1 | 6/2018 | Zheng et al. | |
| 10,125,683 B2* | 11/2018 | Caruel | B64D 33/02 |
| 10,144,520 B2* | 12/2018 | Victor | B64D 15/04 |
| 10,167,085 B2* | 1/2019 | Wiberg | B64D 15/04 |
| 10,294,873 B2* | 5/2019 | Papa | B64D 13/02 |
| 10,450,955 B2* | 10/2019 | Goodman | B64D 15/04 |
| 10,823,062 B2* | 11/2020 | Chilukuri | B64D 15/04 |
| 2013/0187007 A1 | 7/2013 | Mackin et al. | |
| 2015/0108233 A1* | 4/2015 | Wright | B64D 13/08 |
| | | | 237/12.3 R |
| 2016/0167792 A1 | 6/2016 | Greenberg | |
| 2017/0267360 A1* | 9/2017 | Heid | F02C 9/18 |
| 2020/0346767 A1* | 11/2020 | Pujar | B64D 15/04 |

OTHER PUBLICATIONS

European Patent Office, European Office Action dated Mar. 5, 2021 in Application No. 19206980.5.

* cited by examiner

CONTROL SYSTEM FOR AIRCRAFT ANTI-ICING

CROSS REFERENCE TO RELATED APPLICATIONS

This application claims priority to and benefit of India Patent Application No. 201841041587 titled, "CONTROL SYSTEM FOR AIRCRAFT ANTI-ICING" filed, Nov. 2, 2018. All of the contents of the previously identified application are hereby incorporated by reference for any purpose in their entirety.

FIELD

The disclosure relates generally to vehicles and machinery and, more specifically, to anti-icing systems including bleed air circulation to be used with aircraft and aircraft engines.

BACKGROUND

In operation, a gas turbine engine nacelle may experience conditions in which icing may occur. For example, an engine nacelle of an aircraft, as well as other parts of the aircraft such as the wing leading edge, may experience the formation of ice when operating in cold or below-freezing temperatures. The formation of such ice may dramatically alter one or more flight characteristics of the aircraft. For example, the formation of ice may deleteriously affect the aerodynamics of the aircraft and add additional undesirable weight, as well as generate a hazard when such ice breaks off and potentially strikes another portion of the aircraft. For example, ice breaking loose from the leading edge of the gas turbine engine nacelle inlet may be ingested by the gas turbine engine and thereby severely damage the rotating fan, compressor, and turbine blades.

SUMMARY

In various embodiments, a control system for aircraft anti-icing is disclosed comprising a conduit coupled at a first end to a source of hot high-pressure bleed air, a control valve in fluid communication with the conduit and an injector head, wherein the control valve is in electronic communication with a controller and configured to regulate the flow of bleed air between the conduit and the injector head, a first sensor in electronic communication with the controller and configured to report a first data, and a tangible, non-transitory memory configured to communicate with the controller, the tangible, non-transitory memory having instructions stored thereon that, in response to execution by the controller, cause the controller to perform operations comprising: initializing the control valve to an initial regulated pressure, determining a control temperature, and controlling the control valve based on the control temperature, the first data, and a set value.

In various embodiments, the system may receive a command signal and, in response, retrieve a $P_{upperlimit}$ and a $P_{lowerlimit}$ and calculate the initial regulated pressure based on the $P_{upperlimit}$ and $P_{lowerlimit}$. In various embodiments, the first sensor is a first temperature sensor and the first data is a T1 data; wherein the system further comprises a second temperature sensor in electronic communication with the controller and configured to report a T2 data, and an ice detection sensor in electronic communication with the controller and configured to report a binary ice status, wherein the system may receive the ice status and an ambient temperature. The system may set the T2 data as the control temperature in response to a true ice status.

The system may compare the ambient temperature with an ambient temperature threshold and set the T2 data as the control temperature when the ambient temperature is less than the ambient temperature threshold. The system may compare the ambient temperature with the ambient temperature threshold and set the T1 data as the control temperature when the ambient temperature is greater than the ambient temperature threshold.

In various embodiments, the system may compare the control temperature to the set value. The system may increment the initial regulated pressure where the control temperature is less than the set value to generate a regulated pressure or decrement the initial regulated pressure where the control temperature is greater than the set value to generate the regulated pressure. The system may control the control valve to the regulated pressure. In various embodiments, the system may compare the regulated pressure to the $P_{upperlimit}$ and the $P_{lowerlimit}$ and control the control valve to one of the $P_{upperlimit}$ or the $P_{lowerlimit}$ based on the comparison.

In various embodiments, the system may receive a disable command signal and, in response, control the control valve to a fully closed position. The system may receive an enable command signal and, in response, set the T2 data as the control temperature. In various embodiments, the first temperature sensor is coupled to an outer lipskin of a D-duct and the second temperature sensor is coupled to an inner lipskin of the D-duct.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
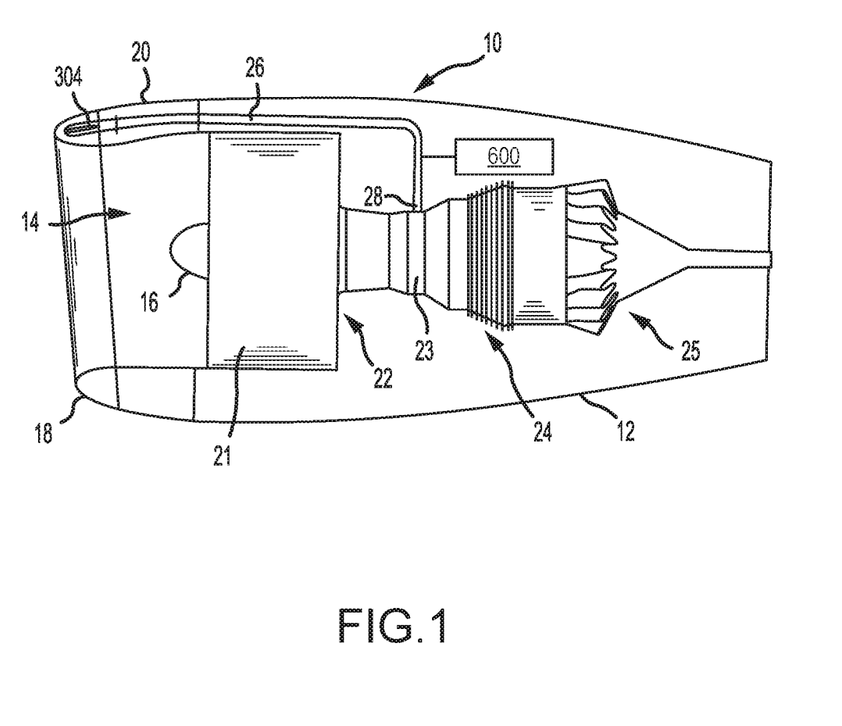
FIG. 1 illustrates an exemplary gas turbine engine including an control system for aircraft anti-icing, in accordance with various embodiments.

In various embodiments and with reference to FIG. 1, a gas turbine engine 10 is provided and housed within a nacelle 12, of which some components are omitted for clarity. Gas, such as air, enters the gas turbine engine 10 through an annular inlet section 14, between the cap 16 (or spinner) of the engine and the annular inlet lip 18 or annular housing which constitutes the forward most section of the engine inlet housing 20 of nacelle 12. Gas turbine engine may produce thrust by: (i) compressing a gas to a core air flow in a compressor section 22 forward of a combustor section 23 positioned with the gas turbine engine core, burning incoming core air flow and fuel within the combustor section 23, and expanding the combustor exhaust through a turbine section 24 aft of the combustor section; and (ii) compressing and passing a large mass bypass air flow of inlet air through the fan section 21 of the gas turbine engine. Hot, high-pressure exhaust gases from the turbine section 24 of the engine 10 pass through exhaust outlet 25 and out the rear of the engine 10. The compressed bypass fan air flows past the outside of the engine core within the engine nacelle cowl housing 12 and exits at the rear of the engine 10.

In various embodiments and when operating in flight under icing conditions, ice may tend to form on the inlet lip 18 of nacelle 12. The ice may alter the geometry of the inlet area between the inlet lip 18 and the spinner 16 tending thereby to disrupt airflow within annular inlet section 14 and reducing gas turbine engine 10 performance. In various embodiments, ice may periodically break free from these components and may be ingested into fan section 21 or compressor section 22 tending thereby to damage internal components of engine 10 such as, for example, stator vanes, rotor blades, radiators, ducting, etc.

Figure 2:
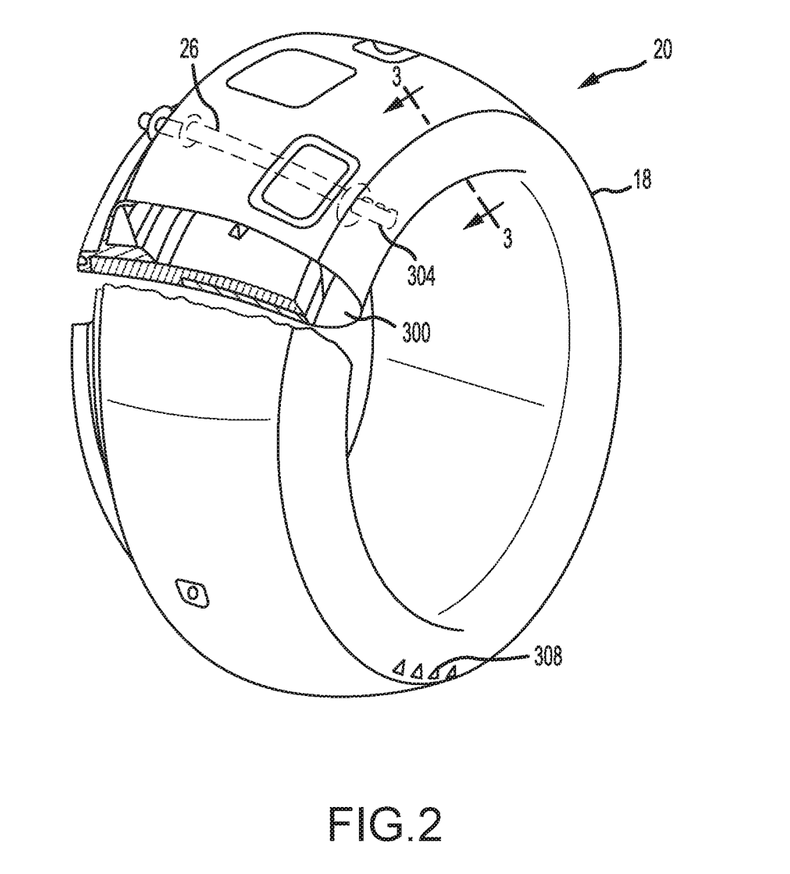
FIG. 2 illustrates a gas turbine engine inlet housing including an anti-icing system, in accordance with various embodiments.
Figure 3:
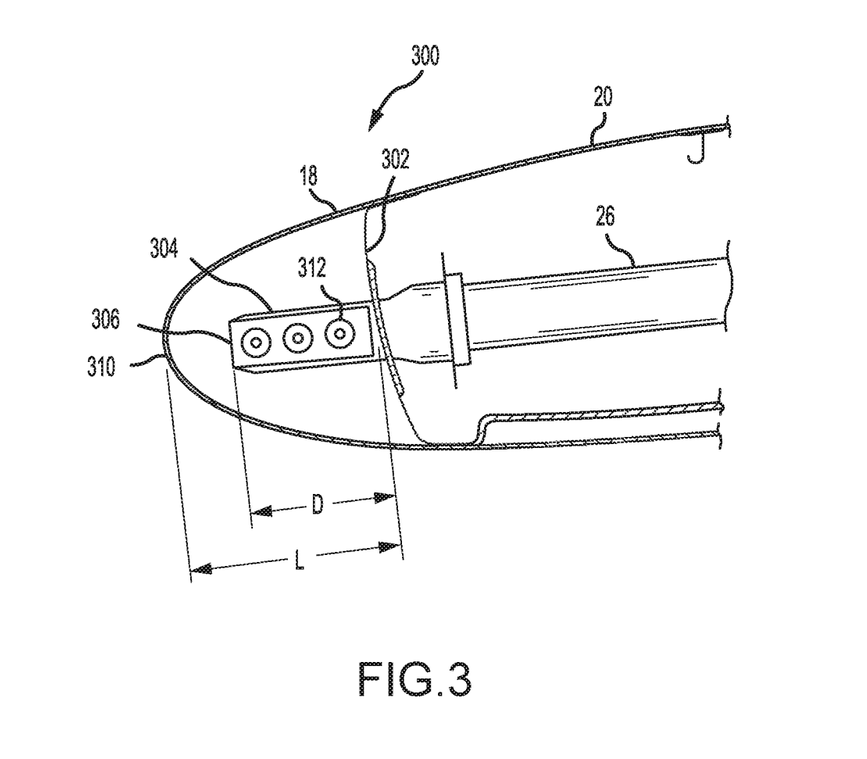
FIG. 3 illustrates a cross section taken along line 3-3 of FIG. 2, in accordance with various embodiments.

In various embodiments and with additional reference to FIGS. 2 and 3, an anti-icing system may comprise a conduit 26 coupled at a first end 28 to a bleed air source of gas turbine engine 10 which provides relatively hot, high pressure, bleed air. In various embodiments, the bleed air source temperature may be between 150° F. [65° C.] and 1400° F. [760° C.] and the source pressure may be between 10 psig [0.6 bar] and 500 psig [34.5 bar]. The other end of conduit 26 passes through inlet housing 20 and penetrates D-duct 300 through a bulkhead 302 which encloses a quantity of air within the annular space created by bulkhead 302 and inlet lip 18. Conduit 26 is fluidly coupled to an injector head 304 which extends into D-duct 300 from bulkhead 302. D-duct 300 may extend a distance L between bulkhead 302 and the leading edge 310 of inlet lip 18. Body 306 of injector head 304 comprises one or more nozzles 312 and may extend into D-duct 300 a distance D between 30% of L and 70% of L. In various embodiments, body 306 may comprise between one or more nozzles 312.

Figure 4A:
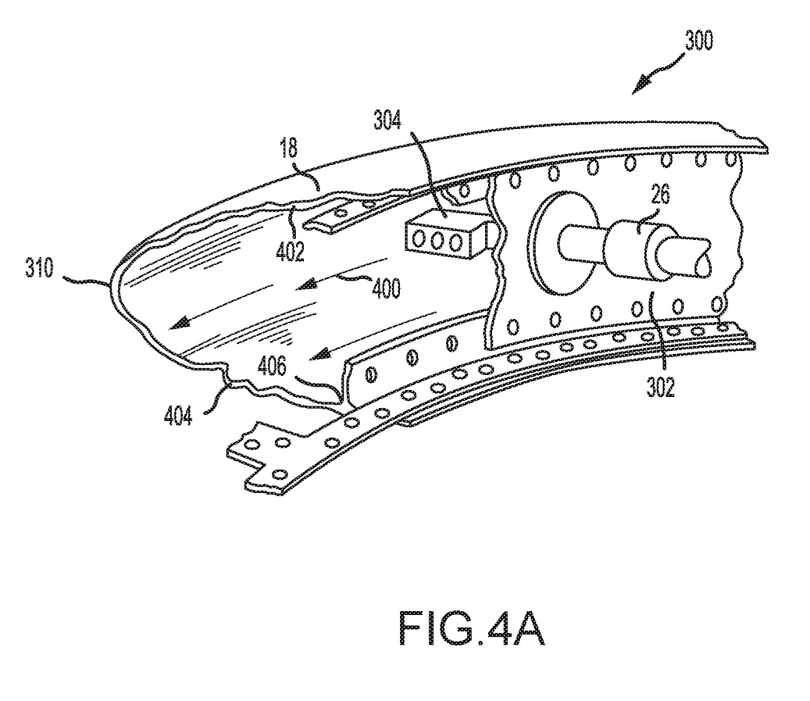
FIG. 4A illustrates a schematic perspective of the details of the D-duct of the anti-icing system, in accordance with various embodiments.
Figure 4B:
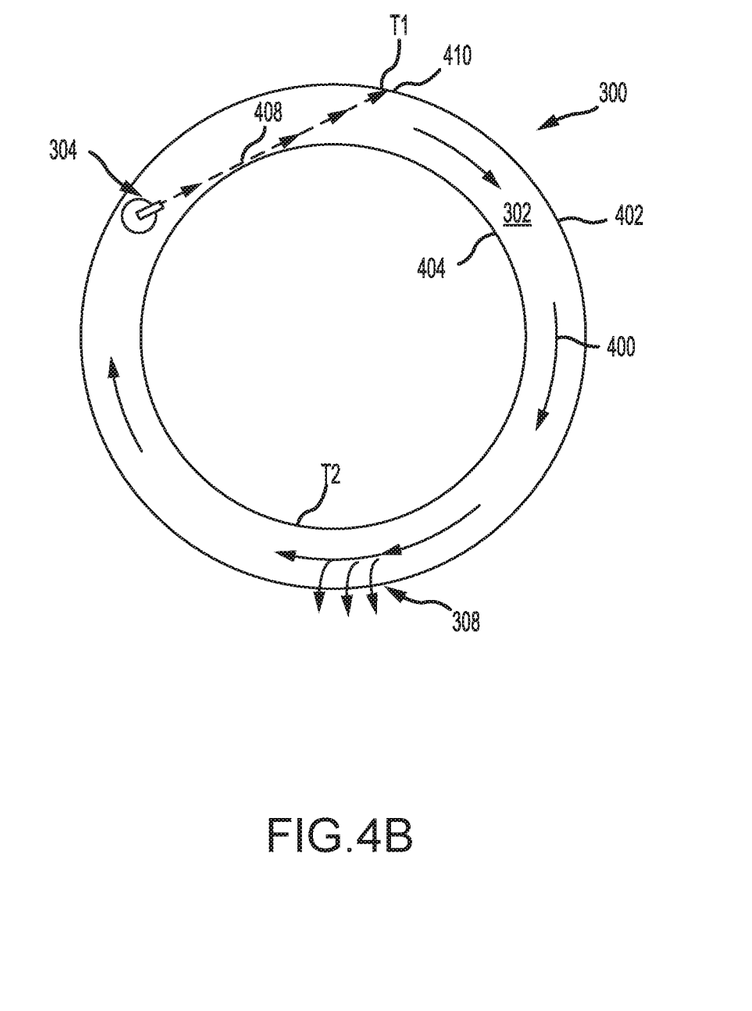
FIG. 4B illustrates a simplified D-duct flow field corresponding to the arrangement of FIG. 4A.

In various embodiments and with additional reference to FIGS. 4A and 4B details of D-duct 300 of the anti-icing system are shown illustrating circulating D-duct flow 400. FIG. 4A illustrates a schematic perspective of the D-duct proximate the injector head 304 and FIG. 4B illustrates a simplified D-duct flow field corresponding to FIG. 4A. Cool, moisture-laden, free-stream air scrubs the exterior of the inlet lip 18 skin, with impinging super-cooled droplets tending to accumulate as ice. Injector head 304 injects the bleed air through the nozzles 312 into the mass of air within the D-duct 300 and jet flow 408 from nozzles 312 entrains the air mass to induce flow 400 in a rotational circulatory motion. The relatively hot and high pressure bleed air mixes with mass of air within the D-duct 300 to increase the temperature of the D-duct air mass to an intermediate temperature sufficient to preclude the formation of ice along inlet lip 18. In various embodiments, the injector head 304 may be oriented with a centerline of nozzles 312 and/or an injector head face relatively tangential to the curve of the D-duct 300.

In this regard, bleed air exiting the nozzles may graze the inner lipskin 404 before eventually impacting the interior surface of the inlet lip 18. Bleed air exiting the nozzles 312 may impact an area of the interior surface of inlet lip 18 in line with the jet flow 408 from nozzles 312, tending thereby to elevate the temperature of the impact area generating a hot spot 410 relative to the remaining area of the inlet lip 18. In various embodiments, the hot spot 410 may exceed 500° F. over an area of the outer lipskin 402 and tend to induce thermal stress relative to the surrounding relatively colder areas thereby promoting metal fatigue, cracking, and/or buckling of the outer lipskin 402. Stated another way, generating a hot spot 410 may tend to exceed a material limit of the lipskin material. In this regard, generating a hot spot tends to degrade lipskin lifetime and may thereby degrade performance of the anti-icing system.

As bleed air is injected via injector head 304, a portion of D-duct flow 400 may recirculate within D-duct 300 while a portion of D-duct flow 400 may exit the D-duct 300 through exhaust ports 308 to the atmosphere. At steady state, the hot air injection inflow into the D-duct through the injector head equals outflow of spent air through the exhaust ports 308. In various embodiments, ejector-like pumping within enclosed geometry of the D-duct 300 results in the circulating flow 400 inside the D-duct 300 which may be several times larger than the injection flow rate. Stated another way, the resulting circulating flow 400 may be described as a self-communicating ejector wherein the D-duct flow being pumped in the nozzle region circulates around within the inlet lip, to once again re-enter the nozzle region. Circulation enhances heat transfer, but skews velocity towards the outer lipskin 402, thereby favoring of heat rejection to outer lipskin 402. Stated another way, the circulating flow 400 inside the D-duct tends to result in a higher speed flow near the outer lipskin 402 of the inlet lip 18 and a lower speed flow near the inner lipskin 404 of inlet lip 18. The magnitude of the circulating flow may be limited by D-duct wall friction and drag at the injector head 304. In various embodiments, the slowest flow is observed proximate the corner 406 between the inner lipskin 404 and the bulkhead 302. In various embodiments, corner 406 may comprise an acute angle tending to benefit heating of the inner lipskin 404 toward a throat station of the inlet.

Figure 5A:
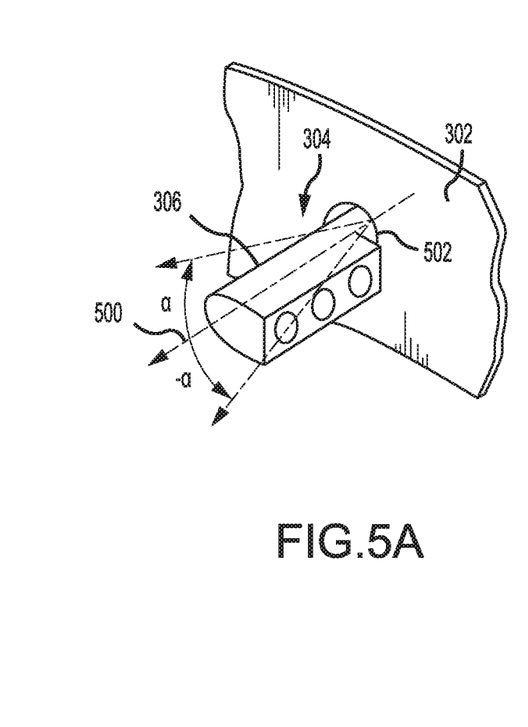
FIG. 5A illustrates geometries of an injector head of an anti-icing system, in accordance with various embodiments.
Figure 5B:
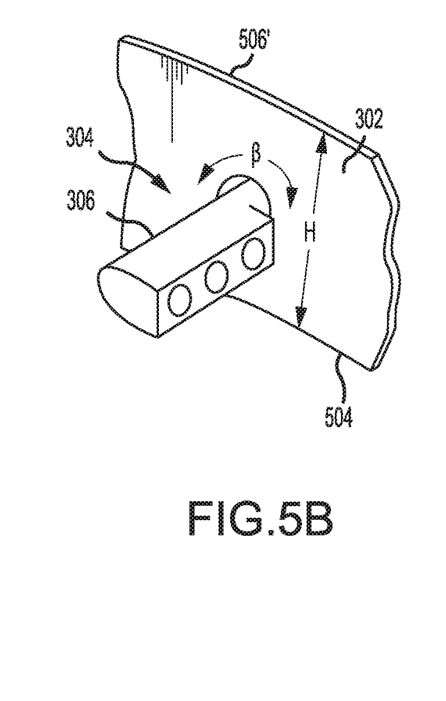
FIG. 5B illustrates geometries of an injector head of an anti-icing system, in accordance with various embodiments.

With additional reference to FIGS. 5A and 5B, body geometries and orientations of an injector head 304 are shown with relation to bulkhead 302. Body 306 of injector head 304 extends from bulkhead 302 along a perpendicular centerline 500 that is perpendicular to the bulkhead 302. In various embodiments, body 306 may be oriented at an angle α relatively away from the centerline. Stated another way, body 306 may be "bent" proximate the penetration point 502 at bulkhead 302. In like regard and in various embodiments, body 306 may be rotated to an angle β relative to a perpendicular plane extending from bulkhead 302. Bulkhead has a height H defined between an inboard edge 504 and an outboard edge 506 and the penetration point 502 may be located between 30% to 70% of distance H as taken from the inboard edge 504 (proximate the inner lipskin 404).

Figure 6:
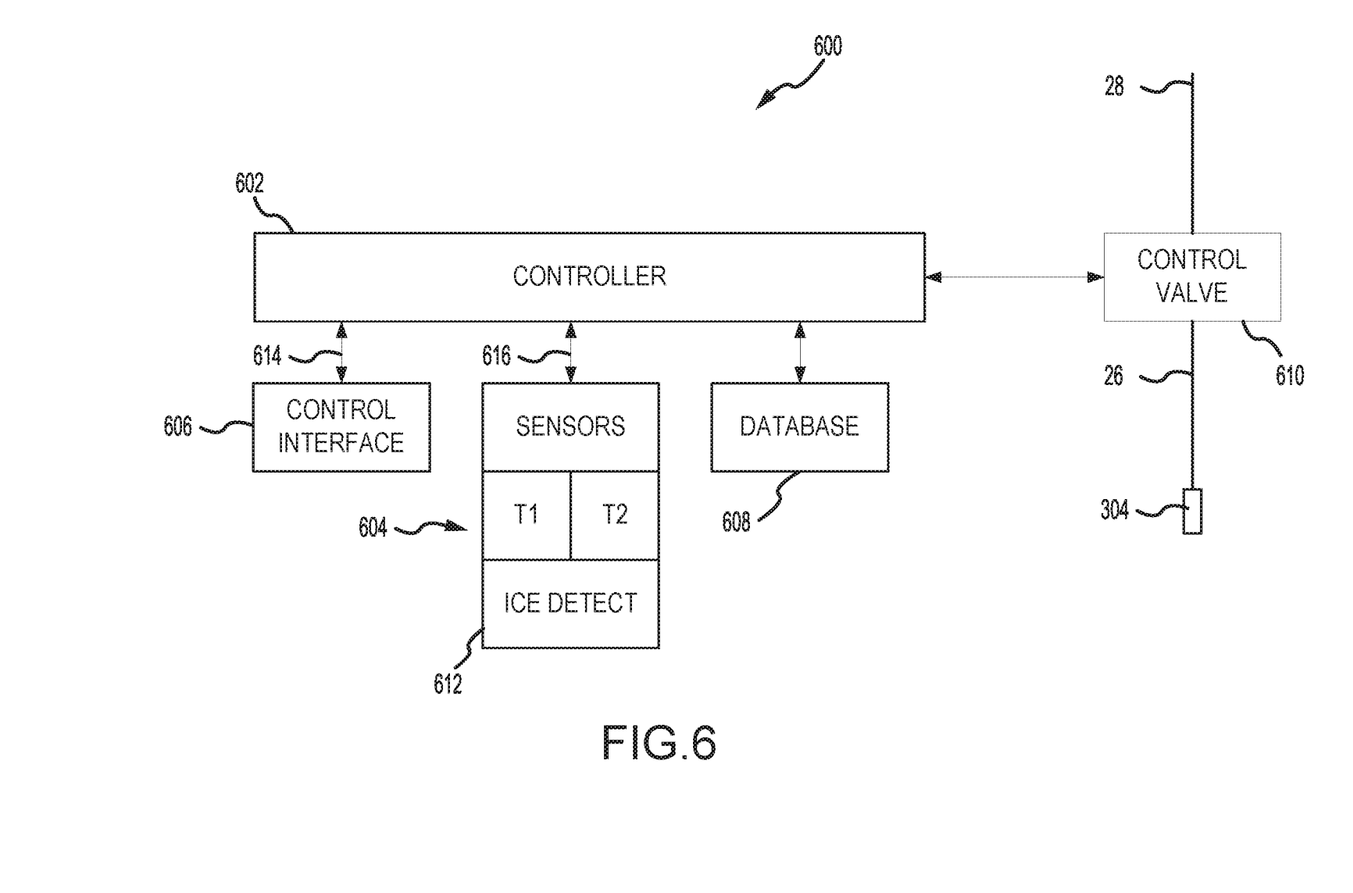
FIG. 6 illustrates a schematic diagram of a control system for aircraft anti-icing, in accordance with various embodiments.

With additional reference to FIG. 6 a block diagram for a control system 600 for aircraft anti-icing is illustrated. Control system 600 includes controller 602, sensors 604 which may include ice detector 612, control interface 606, database 608, and control valve 610.

Controller 602 may comprise at least one computing device in the form of a computer or processor, or a set of computers/processors, although other types of computing units or systems may be used. In various embodiments, controller 602 may be implemented as and may include one or more processors and/or one or more tangible, non-transitory memories and be capable of implementing logic. Each processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 602 may comprise a processor configured to implement various logical operations in response to execution of instructions, for example, instructions stored on a non-transitory, tangible, computer-readable medium configured to communicate with controller 602. In various embodiments, controller 602 may be integrated into computer systems onboard an aircraft, such as, for example a Full Authority Digital Engine Control (FADEC) system.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Controller 602 is in electronic communication with sensors 604 which may be coupled to or in electronic communication with gas turbine engine 10 and the anti-icing system. Sensors 604 may comprise a temperature sensor, a torque sensor, a speed sensor, a pressure sensor, a position sensor, an accelerometer, a mass flow sensor, or any other suitable measuring device known to those skilled in the art. Sensors 604 may be configured to measure a characteristic of an aircraft system or component such as gas turbine engine 10. In various embodiments, sensors 604 include a first temperature sensor T1, a second temperature sensor T2, and an ice detection sensor 612.

Sensors 604 may be configured to measure, for example, a lipskin temperature, a shaft speed, a flow rate, a pressure, a control valve position, an ambient temperature, a compressor exit temperature, an ice condition, and/or the like. Sensors 604 may be configured to transmit the measurements to controller 602, thereby providing sensor feedback about the aircraft system to controller 602. The sensor feedback may be, for example, a speed signal, or may be position feedback, temperature feedback, pressure feedback and/or other data. In various embodiments, T1 may be mounted on the outer lipskin 402 proximate hot spot 410 and may provide temperature feedback of the relatively hot area of the outer lipskin 402. In like regard, T2 may be mounted on the inner lipskin 404 proximate exhaust ports 308 and thereby provide temperature feedback of a relatively cold area of the inner lipskin 404.

Database 608 may be configured to communicate with controller 602 and to store and maintain data such as sensor data 616, configuration settings, temperature response models, and/or the like. Database 608 may be in operative and/or electronic communication with controller 602, sensors 604, and control interface 606. Data may be stored or recalled from database 608 in response to commands from controller 602. Data may be stored in database 608 using any suitable technique described herein or known in the art. In various embodiments, configuration settings may include a control valve pressure regulation upper limit ($P_{upperlimit}$), a control valve pressure regulation lower limit ($P_{lowerlimit}$), and a lipskin temperature setting (set value). In various embodiments, the set value may be between 35° F. [1.6° C.] and 500° F. [260° C.] or may be between, 50° F. [10° C.] and 400° F. [205° C.], or may be between 50° F. [10° C.] and 100° F. [38° C.]. The $P_{upperlimit}$ and $P_{lowerlimit}$ may be calculated analytically. For example, $P_{upperlimit}$ may be calculated based on a worst case icing condition and the $P_{lowerlimit}$ may be calculated based on a worst case dry air condition (i.e. a worst case non-icing condition).

In various embodiments, controller 602 may be in electronic communication with a pilot of an aircraft through a control interface 606 such as, for example, a switch panel in a cockpit of the aircraft. The control interface 606 may display a status of the controller 602 and/or other system element status or may display measurements of sensors 604. Control interface 606 may provide command signals 614 to controller 602. In various embodiments, the command signals may be of the form 'ENABLE, 'DISABLE', or 'AUTOMATIC'.

Control valve 610 may be in electronic communication with controller 602 and be configured to be controlled by controller 602. Control valve 610 may be a pressure regulator in fluid communication between the bleed air source and the conduit 26 feeding injector head 304. In this regard, controller 602 and control valve 610 may control the pressure of bleed air injected into D-duct 300 by injector head 304 and thereby control the temperature of the inner lipskin 404 and the outer lipskin 402. In various embodiments, controller 602 may receive a DISABLE command signal and in response command the control valve 610 to a fully closed position.

Figure 7A:
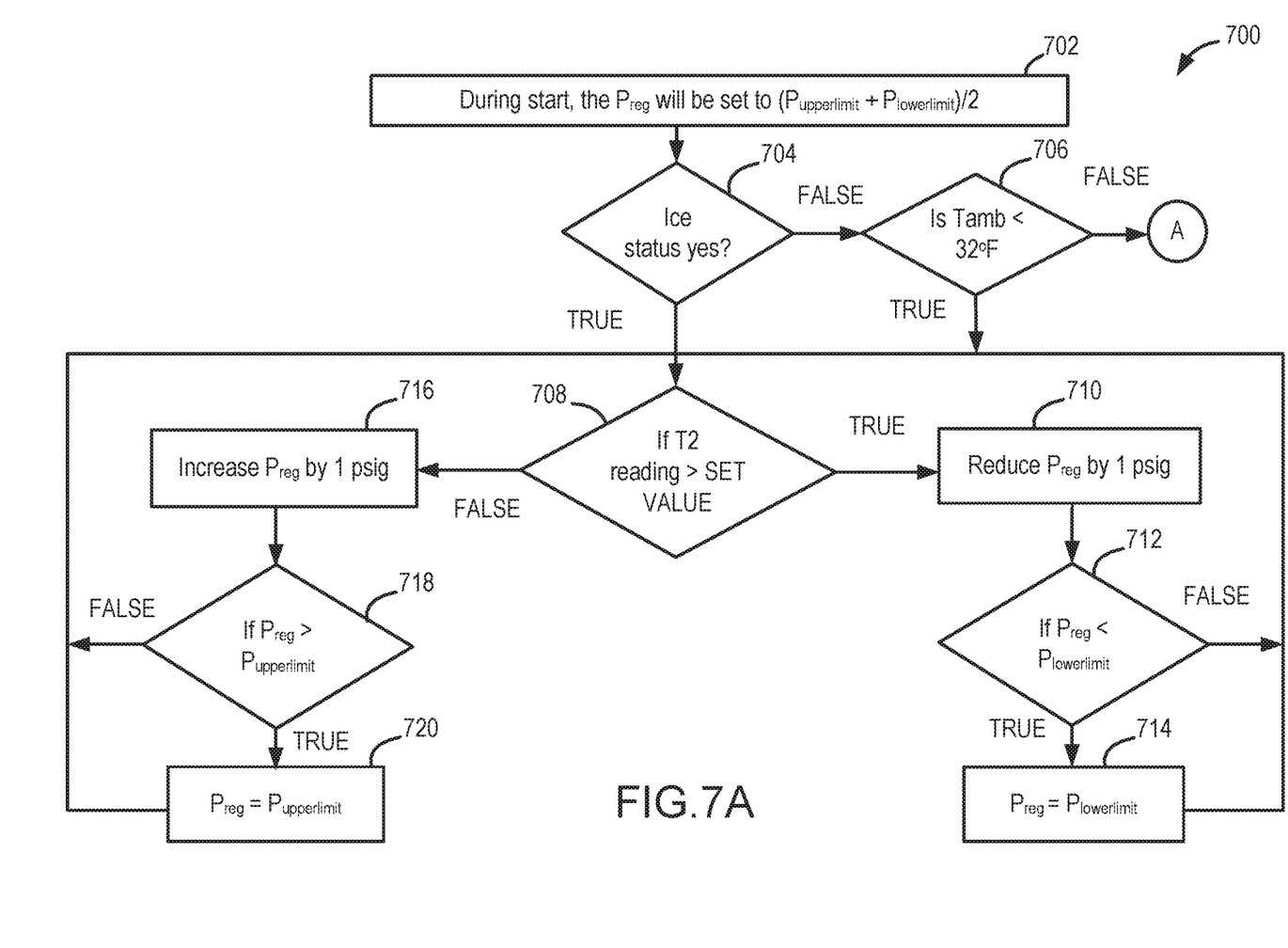
FIG. 7A illustrates a process flow for a control system for aircraft anti-icing, in accordance with various embodiments.
Figure 7B:
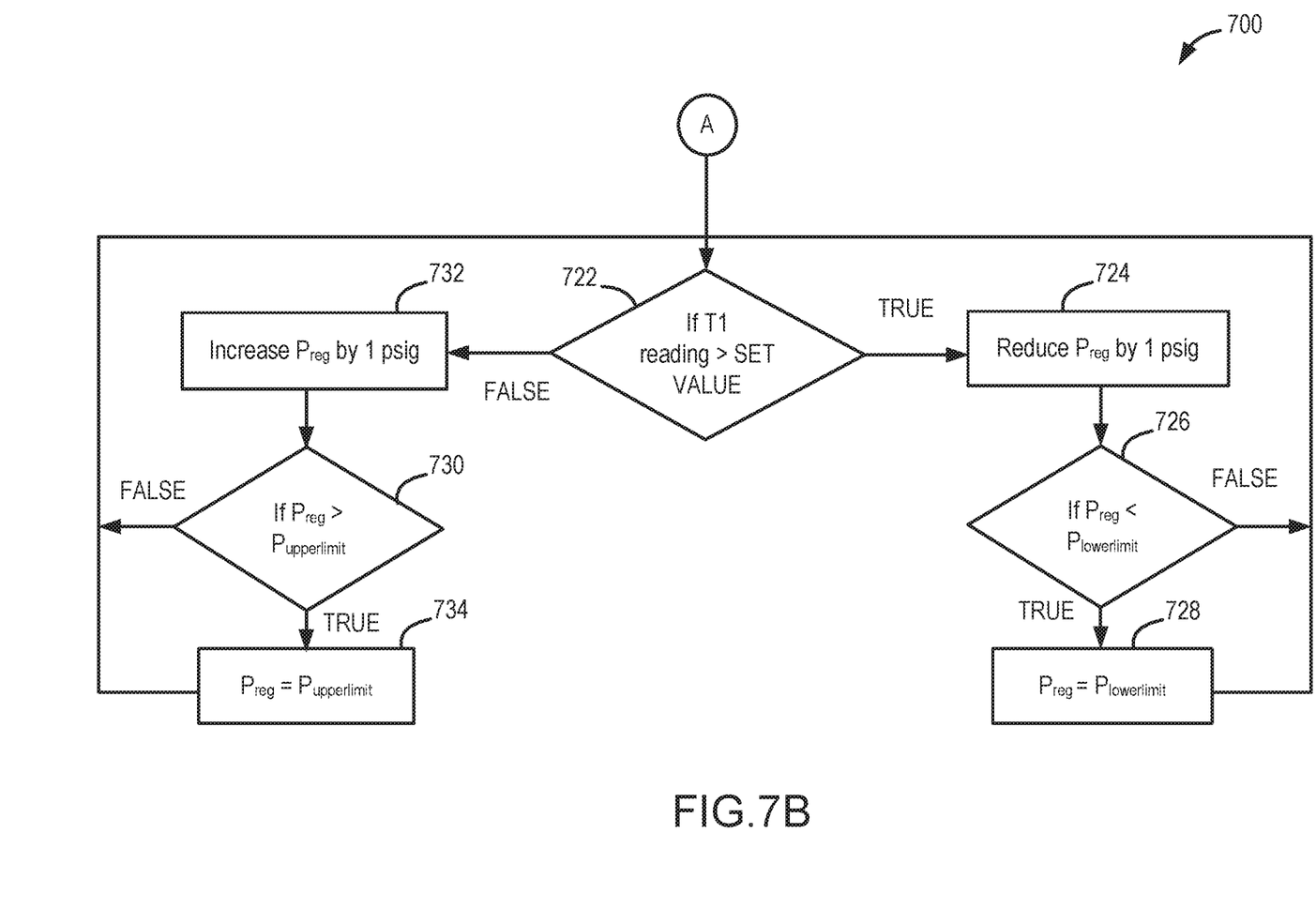
FIG. 7B illustrates a process flow for a control system for aircraft anti-icing, in accordance with various embodiments.

With additional reference to FIGS. 7A and 7B, a process flow 700 for temperature control in a control system for aircraft anti-icing is illustrated. The controller may determine an initial regulated pressure ($P_{reg}$) based on the configuration settings and initialize the control valve to the initial regulated pressure (step 702). Step 702 includes receiving by controller 602 one of the ENABLE or AUTOMATIC command signals 614 from control interface 606. Step 702 includes retrieving by controller 602 the $P_{upperlimit}$ and $P_{upperlimit}$ from database 608 and calculating the $P_{reg}$ based on the $P_{upperlimit}$ and $P_{lowerlimit}$. Step 702 includes controller 602 controlling the control valve 610 to output the $P_{reg}$ pressure.

In response to initializing the control valve 610, the controller 602 may determine a control temperature and may control the control valve based on the control temperature and the set value. Controller 602 may receive sensor data 616 from ice detection sensor 612 including a binary ice status (e.g. indicating a presence or absence of at least some ice) and may select the T2 control temperature based on the true ice status (step 704). In response to the false ice status, controller 602 may receive an ambient temperature data and may select the T2 control temperature when the ambient temperature data is below an ambient temperature threshold or select the T1 control temperature when the ambient temperature is above the ambient temperature threshold (step 706). In various embodiments, the ambient temperature threshold may be about 32° F. [0° C.]. In various embodiments, the set value may vary based on the selecting the T1 or the T2 control temperature. For example, a T1 set value (i.e., a first set value) may be based on a dry air material temperature limit whereas a T2 set value (i.e., a second set value) may be based on a component ice thickness limit and controller 602 may select the first set value or the second set value in response to determining the control temperature.

In various embodiments, controller may select the T2 control temperature in response to receiving the ENABLE command signal. In response to selecting the T2 control temperature, controller 602 may receive the T2 temperature data and compare the T2 temperature data with the set value (step 708). Controller 602 may control the control valve 610 based on the comparison between the T2 temperature and the set value. Where the T2 temperature is greater than the set value, controller 602 may decrement the $P_{reg}$ pressure (step 710). In response to decrementing the $P_{reg}$ pressure, controller 602 may compare the $P_{reg}$ pressure with the $P_{lowerlimit}$ and based on the comparison return to step 708 when $P_{reg}$ is greater than the $P_{lowerlimit}$ (step 712) or set $P_{reg}$ pressure to equal the $P_{lowerlimit}$ and return to step 708 (step 714). In like regard, where the T2 temperature is less than the set value, controller 602 may increment the $P_{reg}$ pressure (step 716). In response to incrementing the $P_{reg}$ pressure, controller 602 may compare the $P_{reg}$ pressure with the $P_{upperlimit}$ and based on the comparison return to step 708 when $P_{reg}$ is less than the $P_{upperlimit}$ (step 718) or set $P_{reg}$ pressure to equal the $P_{upperlimit}$ and return to step 708 (step 720).

In various embodiments, in response selecting the T1 control temperature controller 602 may receive the T1 temperature data and compare the T1 temperature data with the set value (step 722). Controller 602 may control the control valve 610 based on the comparison between the T1 temperature and the set value. Where the T1 temperature is greater than the set value, controller 602 may decrement the $P_{reg}$ pressure (step 724). In response to decrementing the $P_{reg}$ pressure, controller 602 may compare the $P_{reg}$ pressure with the $P_{lowerlimit}$ and based on the comparison return to step 722 when $P_{reg}$ is greater than the $P_{lowerlimit}$ (step 726) or set $P_{reg}$ pressure to equal the $P_{lowerlimit}$ and return to step 722 (step 728). In like regard, Where the T1 temperature is less than the set value, controller 602 may increment the $P_{reg}$ pressure (step 732). In response to incrementing the $P_{reg}$ pressure, controller 602 may compare the $P_{reg}$ pressure with the $P_{upperlimit}$ and based on the comparison return to step 722 when $P_{reg}$ is less than the $P_{upperlimit}$ (step 730) or set $P_{reg}$ pressure to equal the $P_{upperlimit}$ and return to step 722 (step 734).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A control system for aircraft anti-icing comprising:
   a conduit coupled at a first end to a source of hot high-pressure bleed air;
   a control valve in fluid communication with the conduit and an injector head, wherein the control valve is in electronic communication with a controller and configured to regulate a flow of the hot high-pressure bleed air between the conduit and the injector head;
   a first sensor in electronic communication with the controller and configured to report a first data; and
   a tangible, non-transitory memory configured to communicate with the controller, the tangible, non-transitory memory having instructions stored thereon that, in response to execution by the controller, cause the controller to perform operations comprising:
   initializing, by the controller, the control valve to an initial regulated pressure;
   determining, by the controller, a control temperature;
   controlling, by the controller, the control valve based on the control temperature, the first data, and a set value;
   receiving, by the controller, a command signal and, in response, retrieving, by the controller, a $P_{upperlimit}$ and a $P_{lowerlimit}$ and calculating, by the controller, the initial regulated pressure based on the $P_{upperlimit}$ and the $P_{lowerlimit}$.

2. The control system of claim 1, wherein the first sensor is a first temperature sensor and the first data is a T1 data; wherein the control system further comprises:
   a second temperature sensor in electronic communication with the controller and configured to report a T2 data; and
   an ice detection sensor in electronic communication with the controller and configured to report a binary ice status,
   wherein the operations further comprise:
   receiving, by the controller, the ice status and an ambient temperature;
   setting, by the controller, the T2 data as the control temperature in response to a true ice status; or
   comparing, by the controller, the ambient temperature with an ambient temperature threshold and setting, by the controller, the T2 data as the control temperature when the ambient temperature is less than the ambient temperature threshold; or
   comparing, by the controller, the ambient temperature with the ambient temperature threshold and setting, by the controller, the T1 data as the control temperature when the ambient temperature is greater than the ambient temperature threshold.

3. The control system of claim 2, wherein the operations further comprise:
   comparing, by the controller, the control temperature to the set value;
   incrementing, by the controller, the initial regulated pressure where the control temperature is less than the set value to generate a regulated pressure; or
   decrementing, by the controller, the initial regulated pressure where the control temperature is greater than the set value to generate the regulated pressure; and
   controlling, by the controller, the control valve to the regulated pressure.

4. The control system of claim 3, wherein the operations further comprise:
   comparing, by the controller, the regulated pressure to the $P_{upperlimit}$ and the $P_{lowerlimit}$;
   and controlling, by the controller, the control valve to one of the $P_{upperlimit}$ or the $P_{lowerlimit}$ based on the comparison.

5. The control system of claim 4, wherein the operations further comprise:
   receiving, by the controller, a disable command signal and, in response, controlling the control valve to a fully closed position; and
   receiving, by the controller, an enable command signal and, in response, setting, by the controller, the T2 data as the control temperature.

6. The control system of claim 2, wherein the first temperature sensor is coupled to an outer lipskin of a D-duct and the second temperature sensor is coupled to an inner lipskin of the D-duct.

7. A method comprising:
   initializing, by a controller, a control valve to an initial regulated pressure, wherein the control valve is in electronic communication with the controller and configured to regulate a flow of bleed air between a conduit and an injector head;
   determining, by the controller, a control temperature; and
   controlling, by the controller, the control valve based on the control temperature, a first data from a first sensor in electronic communication with the controller, and a set value;
   receiving, by the controller, a command signal and, in response, retrieving, by the controller, a $P_{upperlimit}$ and a $P_{lowerlimit}$ and calculating the initial regulated pressure based on the $P_{upperlimit}$ and the $P_{lowerlimit}$.

8. The method of claim 7, wherein the first sensor is a first temperature sensor and the first data is a T1 data; wherein the method further comprises:
   receiving, by the controller, a T2 data from a second temperature sensor in electronic communication with the controller;
   receiving, by the controller, a binary ice status from an ice detection sensor in electronic communication with the controller and an ambient temperature;
   setting, by the controller, the T2 data as the control temperature in response to a true ice status; or
   comparing, by the controller, the ambient temperature with an ambient temperature threshold and setting, by the controller, the T2 data as the control temperature when the ambient temperature is less than the ambient temperature threshold; or
   comparing, by the controller, the ambient temperature with the ambient temperature threshold and setting, by the controller, the T1 data as the control temperature when the ambient temperature is greater than the ambient temperature threshold.

9. The method of claim 8, further comprising:
   comparing, by the controller, the control temperature to the set value;
   incrementing, by the controller, the initial regulated pressure where the control temperature is less than the set value to generate a regulated pressure; or
   decrementing, by the controller, the initial regulated pressure where the control temperature is greater than the set value to generate the regulated pressure; and
   controlling, by the controller, the control valve to the regulated pressure.

10. The method of claim 9, further comprising:
    comparing, by the controller, the regulated pressure to the $P_{upperlimit}$ and the $P_{lowerlimit}$;

and controlling, by the controller, the control valve to one of the $P_{upperlimit}$ or the $P_{lowerlimit}$ based on the comparison.

11. The method of claim 10, further comprising:
receiving, by the controller, a disable command signal and, in response, controlling the control valve to a fully closed position; and
receiving, by the controller, an enable command signal and, in response, setting, by the controller, the T2 data as the control temperature.

12. The method of claim 8, wherein the first temperature sensor is coupled to an outer lipskin of a D-duct and the second temperature sensor is coupled to an inner lipskin of the D-duct.

13. An article of manufacture including a tangible, non-transitory computer-readable storage medium having instructions stored thereon that, in response to execution by a processor, cause the processor to perform operations comprising:
initializing, by the processor, a control valve to an initial regulated pressure, wherein the control valve is in electronic communication with the processor and configured to regulate a flow of bleed air between a conduit and an injector head;
determining, by the processor, a control temperature; and
controlling, by the processor, the control valve based on the control temperature, a first data from a first sensor in electronic communication with the processor, and a set value;
receiving, by the processor, a command signal and, in response, retrieving, by the processor, a $P_{upperlimit}$ and a $P_{lowerlimit}$ and calculating the initial regulated pressure based on the $P_{upperlimit}$ and the $P_{lowerlimit}$.

14. The article of manufacture of claim 13, wherein the first sensor is a first temperature sensor and the first data is a T1 data; wherein the operations further comprise:
receiving, by the processor, a T2 data from a second temperature sensor in electronic communication with the processor;
receiving, by the processor, a binary ice status from an ice detection sensor in electronic communication with the processor and an ambient temperature;
setting, by the processor, the T2 data as the control temperature in response to a true ice status; or
comparing, by the processor, the ambient temperature with an ambient temperature threshold and setting, by the processor, the T2 data as the control temperature when the ambient temperature is less than the ambient temperature threshold; or
comparing, by the processor, the ambient temperature with the ambient temperature threshold and setting, by the processor, the T1 data as the control temperature when the ambient temperature is greater than the ambient temperature threshold.

15. The article of manufacture of claim 14, wherein the operations further comprise:
comparing, by the processor, the control temperature to the set value;
incrementing, by the processor, the initial regulated pressure where the control temperature is less than the set value to generate a regulated pressure; or
decrementing, by the processor, the initial regulated pressure where the control temperature is greater than the set value to generate the regulated pressure; and
controlling, by the processor, the control valve to the regulated pressure.

16. The article of manufacture of claim 15, wherein the operations further comprise:
comparing, by the processor, the regulated pressure to the $P_{upperlimit}$ and the $P_{lowerlimit}$;
and controlling, by the processor, the control valve to one of the $P_{upperlimit}$ or the $P_{lowerlimit}$ based on the comparison.

17. The article of manufacture of claim 16, wherein the operations further comprise:
receiving, by the processor, a disable command signal and, in response, controlling the control valve to a fully closed position; and
receiving, by the processor, an enable command signal and, in response, setting, by the processor, the T2 data as the control temperature.

* * * * *